United States Patent [19]

Ohara et al.

[11] Patent Number: 5,685,229
[45] Date of Patent: Nov. 11, 1997

[54] RAILWAY CAR BODY STRUCTURES AND METHOD OF MAKING THEM

[75] Inventors: Mamoru Ohara; Morishige Hattori; Yoshinao Okumoto; Masato Okazaki; Michifume Takeichi; Katsutoshi Horihata; Kengi Kimura, all of Kudamatsu, Japan

[73] Assignee: Hitachi, Ltd., Tokyo, Japan

[21] Appl. No.: 455,567

[22] Filed: May 31, 1995

Related U.S. Application Data

[63] Continuation of Ser. No. 274,740, Jul. 18, 1994, Pat. No. 5,433,151, which is a continuation-in-part of Ser. No. 79,568, Jun. 22, 1993, abandoned, which is a continuation of Ser. No. 958,769, Oct. 9, 1992, abandoned, which is a continuation of Ser. No. 755,741, Sep. 6, 1991, abandoned.

[30] Foreign Application Priority Data

May 11, 1994 [JP] Japan ............... 6-97161
Sep. 7, 1994 [JP] Japan ............... 2-235517

[51] Int. Cl.⁶ ............................................. B61D 17/04
[52] U.S. Cl. ............................ 105/397; 105/401; 296/191
[58] Field of Search ............................. 105/396, 397, 105/400, 401, 404, 409; 296/191, 187, 203, 197

[56] References Cited

U.S. PATENT DOCUMENTS

| | | | |
|---|---|---|---|
| 2,121,670 | 6/1938 | Savies | 296/191 |
| 3,087,441 | 4/1963 | Martin | 296/191 |
| 4,685,721 | 8/1987 | Banerjea | 296/191 |
| 5,042,395 | 8/1991 | Wackerle et al. | 105/397 |
| 5,140,913 | 8/1992 | Takeichi et al. | 105/397 |
| 5,199,632 | 4/1993 | Takeichi et al. | 228/181 |

FOREIGN PATENT DOCUMENTS

| | | |
|---|---|---|
| 354436 | 2/1990 | European Pat. Off. |
| 8810688 | 2/1990 | France |
| 183007 | 12/1979 | Japan |
| 179569 | 11/1985 | Japan |
| 193760 | 7/1990 | Japan |

OTHER PUBLICATIONS

"Light Metal Rolling Stock Committee Report No. 3"; (1974–1977); Japan Association of Rolling Stock Industries Corporation; pp. 69–72. 1977.

"Engineering Materials and Their Applications"; Flinn et al; Houghton Mifflen Co., p. 440. 1986.

"Aircraft Structures: Second Edition"; Peery et al; McGraw-Hill Book Company; pp. 92–94 1982.

"Sandwich Construction and Design"; Hackman; Jacobs Publishing Co. in Analysis and Design of Flight Vehicle Structures by Bruhn; pp. C21.1–C12.8. 1973.

*Primary Examiner*—S. Joseph Morano
*Attorney, Agent, or Firm*—Antonelli, Terry, Stout & Kraus, LLP

[57] ABSTRACT

A railway car body structure is provided which includes an underframe, first and second side structural units and a roof structural unit. Each of the first and second side structural units and the roof structural unit include at least one plate member, each plate members being formed by joining two surface materials, a core material and binding materials through metal-to-metal brazing. The first side structural units is joined to the roof structural unit by a first extruded element, while the second side structural unit is joined to the roof structural unit by a second extruded element. With this construction an extremely strong, yet light, railway car body structure is achieved.

7 Claims, 9 Drawing Sheets

RAILWAY CAR BODY STRUCTURES AND METHOD OF MAKING THEM

CROSS REFERENCE TO RELATED APPLICATIONS:

This is a continuation application of U.S. application Ser. No. 08/274,740, filed Jul. 18, 1994, now U.S. Pat. No. 5,443,151; which is a continuation-in-part of U.S. application Ser. No. 08/079,568, filed Jun. 22, 1993, now abandoned, which is a continuation of U.S. application Ser. No. 07/958,769, filed Oct. 9, 1992, now abandoned, which is a continuation application of U.S. application Ser. No. 07/755,741, filed Sep. 6, 1991, now abandoned.

BACKGROUND OF THE INVENTION

1. Field of the Invention

This invention relates to a railway car body structure and the method of making them. More particularly, the present invention relates to a railway car body structure and the corresponding method, which will be suitable for a railway car body which runs at a high speed at which an outdoor pressure change would normally provide an offensive feeling to passengers.

2. Description of the Prior Art

With an increase in a running speed of a railway car body structure, weight reduction of the body structure itself has been attempted. One such proposal constructs plate members and frame members that make up the body structure by a light weight alloy such as an aluminum alloy. Or, plate members and frame members may be integrally formed to produce shaped members, which constitute the body structure. Such a body structure is described, for example, in "Light Metal Rolling Stock Committee Report No. 3" (1974–1977, published by Japan Association of Rolling Stock Industries Corporation), pp. 90–72.

An example of a railway car using an aluminum honeycomb sandwich panel for floor plates so as to reduce the weight of a car body is described in Japanese Utility Model Laid-Open No. 183007/1979 and No. 179569/1985 and Japanese Patent Laid-Open No. 193760/1990. The aluminum honeycomb sandwich panel is produced by superposing surface materials and core materials of an aluminum alloy and bonding then together by a resin bonding material.

An example of a railway car using the honeycomb panel for the plate members for constituting the roof or the floor is described in EP 0354436 A1 and FR 2635064 A1. However, these references do not explain in detail by which the bonding of the honeycomb panel and the frame member or mutual bonding of the frame members is effected in these railway car bodies. Only one explanation given thereby is to the effect that the honeycomb panel and the frame member are joined by rivets.

SUMMARY OF THE INVENTION

Recently, attempts have been made to improve the running speed of railway cars and with an improvement in running speed, the increase in vibration and noise and the increase in power consumption have become critical problems. As to the railway car itself, variations in pressure acting on the surface of its body structure become greater with the increase in the running speed. Particularly, variations in the external pressure on the car body structure becomes great when railway cars pass each other inside a tunnel. Therefore, the pressure resistance of the railway car body structure must be improved with the improvement in the running speed.

To solve the problems described above, both the improvement in the pressure resistance and reduction of the weight of the railway car body structure must be accomplished. The conventional railway car body structure uses the shaped members of a light weight alloy as already described but there is a limit to the present technique in further reducing their thickness. It is therefore expected that in the body structure using the shaped members, the body structure has stiffness above a necessary level and its overall weight becomes great.

In the body structure using the honeycomb panels, on the other hand, there is the problem that a long time and a great deal of labor are necessary for producing the body structure because the welding is not used for joining the panels and the frame members. In other words, when the resin bonding material is used, its application operation is complicated and a long time is necessary for its solidification. There is another problem in that the strength is not uniform. When the rivets, bolts and nuts are used, machining of rough-holes is necessary and automation of the joining operation is difficult.

The conventional railway car body structure does not much consider the disadvantages that occur when the sheet thickness of the surface materials constructed in the honeycomb panel is reduced. In other words, if the thickness of the surface material is reduced, damage is likely to occur to the surface material due to contact with others at the time of handling of the honeycomb panel. Particularly when the surface material is composed of an aluminum alloy, the disadvantage such as holes made by the contact with a tool, etc, is likely to occur. The disadvantage has a high possibility of occurrence even after the body structure is completed, too. When a stone or an article having a pointed tip hits the surface of the car body when the railway car body is completed early, the surface is likely to be relatively easily broken.

When the body structure is composed of the honeycomb panels, such a disadvantage is expected to occur when a pressure variation outside the car body acts on the car or when the weight of passengers, mounted appliances and the body structure itself act on the body structure, unevenness reflecting the shape of the core material occurs on the surface of the surface materials.

It is therefore a first object of the present invention to provide a railway car body structure which is light in weight and has high pressure resistance and strength.

It is a second object of the present invention to provide a production method of a railway car body structure which is efficient at the time of production.

The other objects of the present invention will become more apparent from the following description.

A railway car body structure in accordance with the present invention comprising an underframe, two side units, a roof unit and two end units, wherein at least one of structural members constituting the units described above includes plate members each being formed by joining two surface materials, a core material and binding materials through metal-to-metal bonding, and the thickness of one of the two surface materials of the plate member on an outdoor side of the car body is greater than the thickness of the other surface material on an indoor side.

A production method of a railway car body structure in accordance with the present invention having an underframe, two side units, a roof unit and two end units, comprises the steps of juxtaposing and joining a plurality of plate members, each being formed by joining two surface materials, a core material and binding material through metal-to-metal bonding to constitute a block; juxtaposing and joining a plurality of blocks to constitute structural members of the body structures; and joining a plurality of structural members to constitute the body structure.

DESCRIPTION OF THE PREFERRED EMBODIMENTS

A first embodiment of the present invention will be explained with reference to FIGS. 1 to 5.

Figure 1:
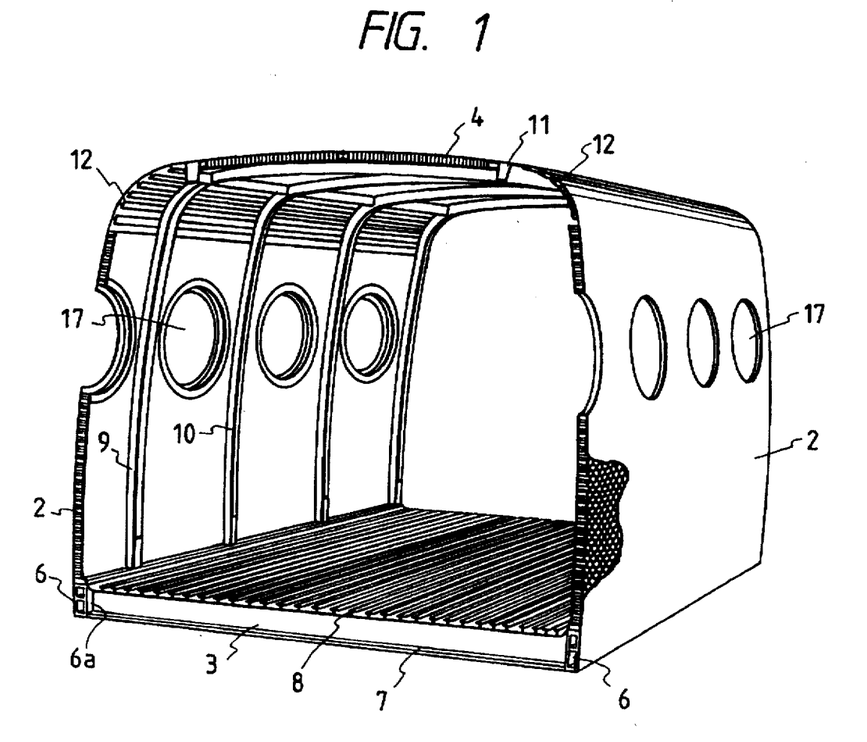
FIG. 1 is a perspective view showing a railway car body structure in accordance with a first embodiment of the present invention.
Figure 2:
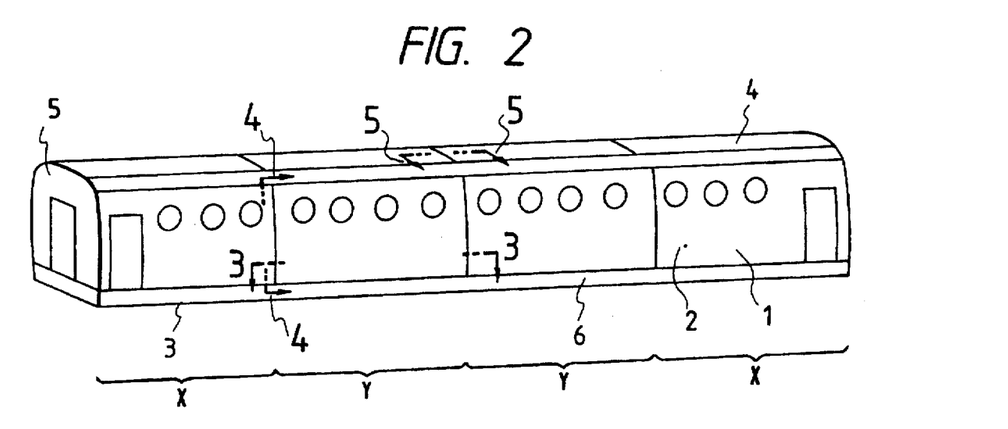
FIG. 2 is a perspective view showing the body structure of FIG. 1 as a whole.

Reference numeral 1 represents a body structure of a railway car and reference numeral 2 represents a side unit forming the side surface portions of the body structure 1. Reference numeral 3 represents an underframe forming the bottom surface portion of the body structure 1 and reference numeral 4 represents a roof unit forming the upper surface portion of the body structure 1. Reference numeral 5 represents an end unit forming the end surface portion of the body structure in its longitudinal direction. The body structure 1 comprises two side units, one underframe 3, one roof unit 4 and two end units 5. Reference numeral 6 represents a side sill forming the underframe 3, and the side sills 6 are disposed on both sides of the underframe 3 in the transverse direction of the car body, extending in the longitudinal direction of the car body. Reference numeral 7 represents cross beams disposed between the side sills 6 on both sides of the underframe 3 in the transverse direction of the car body, and they are disposed at right angles to the side sills 6. The end portions of the cross beams 7 in the longitudinal direction, which are disposed between the side sills 6, are coupled to the side surfaces 6a of the side sills 6, respectively. These cross beams 7 are juxtaposed with predetermined spacings between them in the longitudinal direction of the car body. Reference numeral 8 represents floor plates which are disposed on the cross beams 7. A plurality of shaped members made of a light weight alloy, which are adapted to extend in the longitudinal direction of the car body, are used as the floor plates 8. Each shaped member forming the floor plate 8 ribs having a T-shaped sectional shape on the indoor side, and the ribs are formed integrally with the shaped member. The floor plates 8 are disposed in such a manner so as to define a flat surface in the transverse direction of the car body. They may be disposed in such a manner as to define an arcuate curved plane in the transverse direction of the car body, as well. If the floor plates are disposed so as to form the curved plane, they are effective against variations in an external pressure of the car body and the sheet thickness can be reduced.

The side unit 2 described above is shaped by joining a plurality of blocks in the longitudinal direction of the car body. In other words, the side construction 2 comprises two blocks X forming the portion near a truck disposition position and two blocks Y forming the portion spaced apart from the truck disposition position. The blocks X and Y consist of plate members 50a and 50b and are equipped with side posts 9 and 10. One of the ends of each side post 9, 10 is joined to the side sill 6 and the other end, to a later-appearing cantrail 11. The side post 9 is composed of a shaped member having a U-shaped sectional shape. The side post 9 is joined to the joint portion of each block. The side post 10 is composed of a shaped member having a Π-shaped sectional shape, and is fitted to an intermediate portion of each block in the longitudinal direction of the car body. The side posts 9 and 10 are constructed so that their sectional shapes are linearly symmetric with respect to the center line in a direction orthogonal to the joint surface. A side window opening 17 is formed in side plate members 50a, 50b. Shaped members each having a flange 18 for supporting window glass are disposed around the edge of the side window opening 17. Symbol W in the drawings represents a weld portion.

Figure 3:
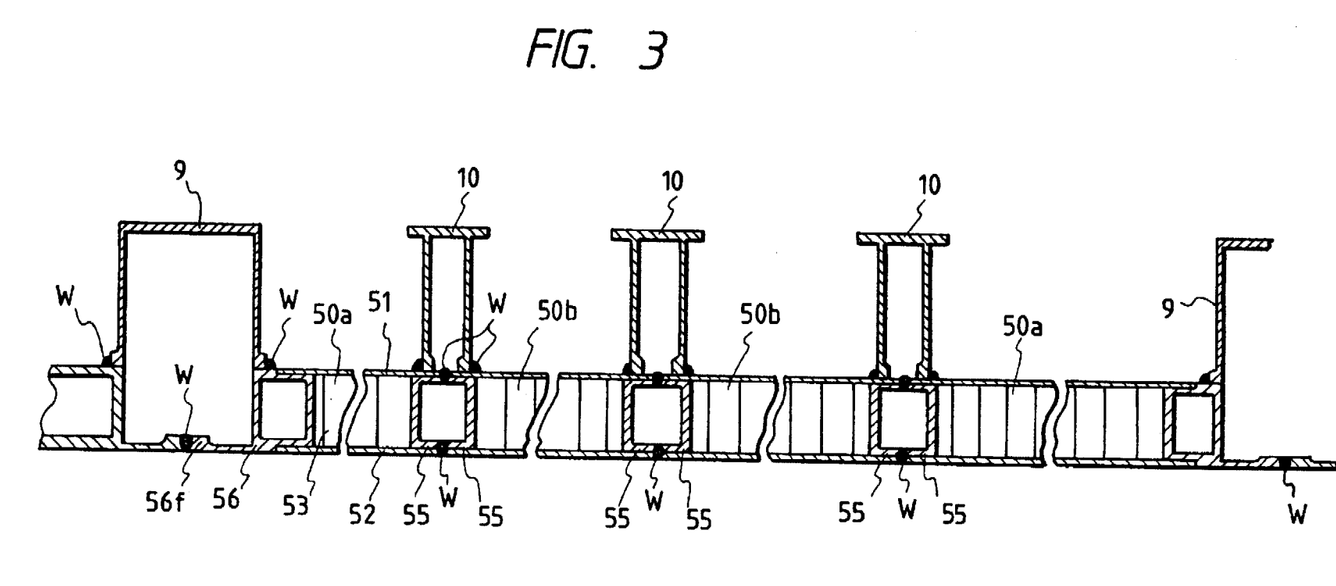
FIG. 3 is a sectional view taken along arrow III—III of FIG. 2.
Figure 4:
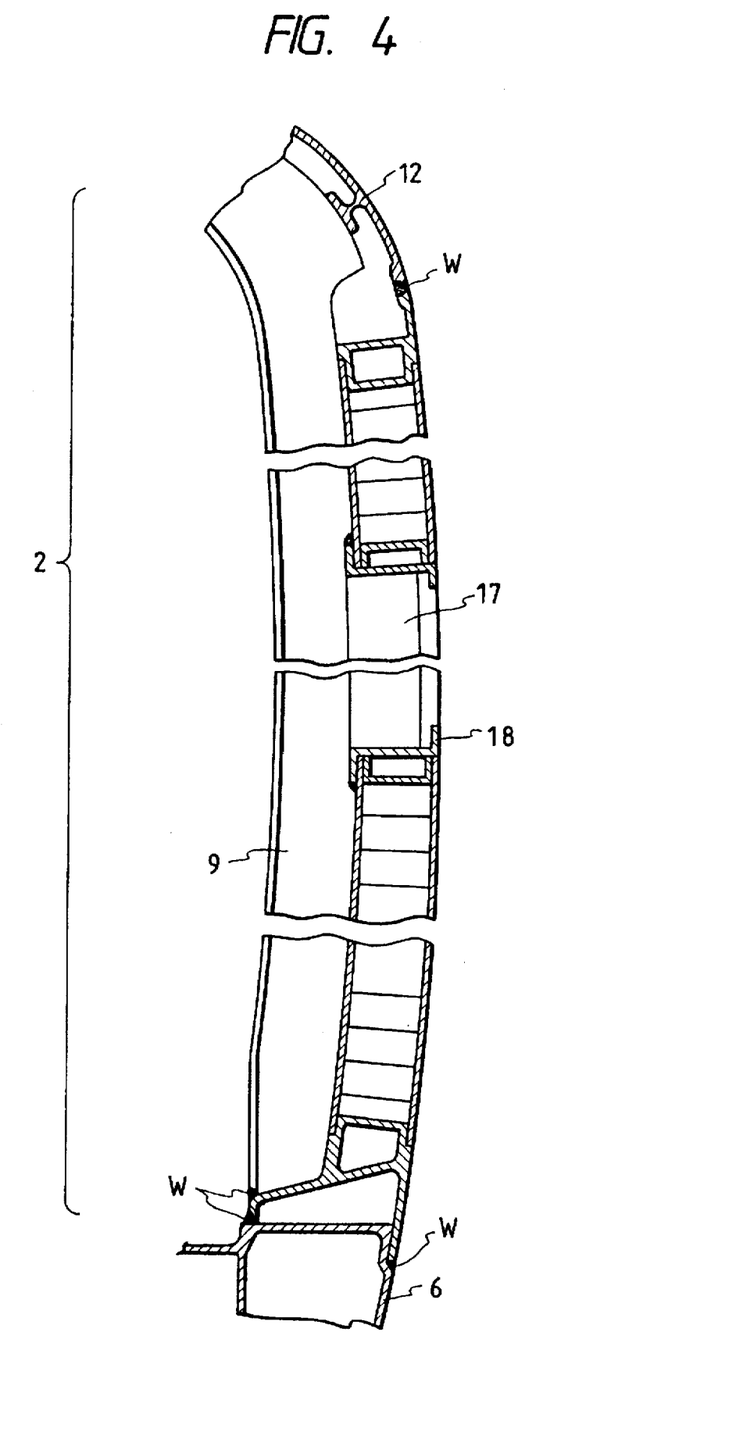
FIG. 4 is a sectional view taken along arrow IV—IV of FIG. 2.
Figure 5:
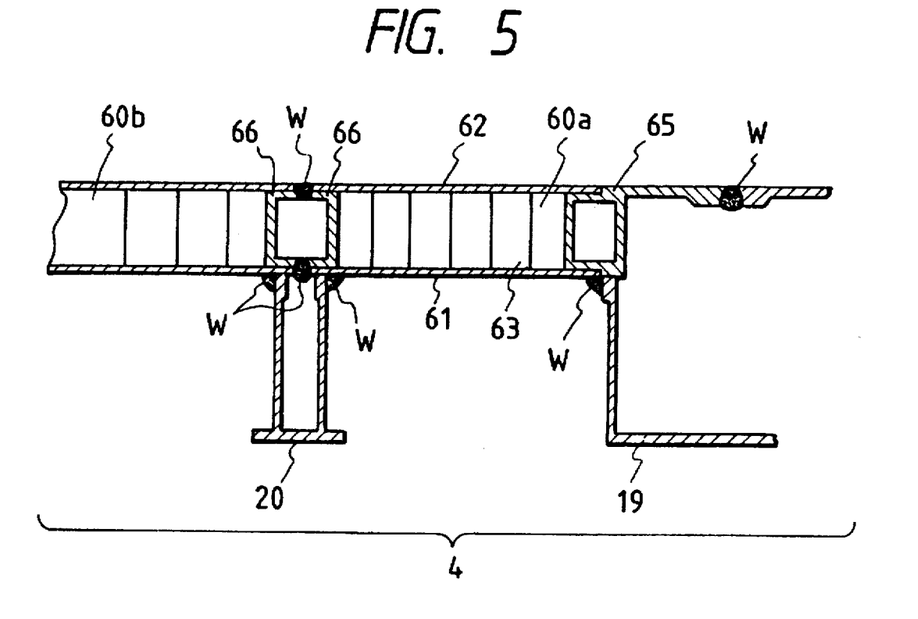
FIG. 5 is a sectional view taken along arrow V—V of FIG. 2.

Each side plate member 50a, 50b is produced by joining surface materials 51, 52, a core material 53 and binding materials 55, 56 by brazing. Each surface material 51, 52 is composed of a thin sheet material made of an aluminum alloy. The core material 53 is produced by bonding two ribbon-like thin sheet materials of an aluminum alloy in a honeycomb shape. The sheet material may have a rectangular or triangular shape besides the honeycomb shape. In the following description, however, the core material is honeycomb-shaped and this will be explained by way of example. The binding material or joint part 55 is composed of a shaped member of an aluminum alloy having a U-shaped sectional shape. The width of this binding material 55 is equal to the thickness of the core material 53. The binding material 56 is composed of a shaped member of an aluminum alloy having a box-shaped sectional shape, one of the sides of which projects in a flange shape. The binding material 56 has a portion whose width is equal to the thickness of the core material 53, and this portion is inserted between the surface materials 51 and 52. The flange 56f of the binding material 56 is constructed so as to define a surface which is continuous to the surface material 52 which defines the outer surface of the body structure 1.

The side plate member 50a, which is disposed at the end portions of the blocks X, Y in the longitudinal direction of the car body includes the core material 53 and the binding materials 55, 56 between the surface materials 51 and 52 described above. The side plate member 50b which is disposed at an intermediate position of the block X, Y in the longitudinal direction of the car body comprises the core material 53 and a plurality of binding materials 55 between the surface materials 51 and 52. Each side plate member 50a, 50b is produced by disposing the binding materials 55, 56 on the outer periphery of the core material 53 and brazing them while they are sandwiched between the surface materials 51 and 52.

Each binding material is produced by heating the surface materials while a load is being applied to the surface materials inside a vacuum furnace. The side plate member 50a, 50b, for example, has a length of about 2 m, a width of about 0.5 to about 1 m and a thickness of about 30 mm. The binding material 56 is disposed at the outer peripheral portion of each block X, Y and its flange 56f projects from the block.

Each block X, Y is produced by disposing the side plate members 50a at the end portions in the longitudinal direction of the car body, disposing a plurality of side plate members 50b between the side plate members 50a and joining these side plate members with one another by welding their respective binding materials 55. The side post 10 which has been described already, is fitted to the joint portion between the side plate member 50a and the side plate member 50b and to the joint portion between the side plate members 50h and 50b by welding, on the internal side of the car body.

The side post 10 is joined to the surface of the surface material 51 in such a manner so as to correspond to two adjacent binding materials 55, 55 of the bonded side plate members 50b. The side post 9 is fitted to the joint portion between the blocks X and Y and to the joint portion between the blocks Y, by welding. The side post 10 is joined to two adjacent binding materials 56, 56 of the joined side plate members 50a. When the side posts 9 and 10 are joined to the side plate members 50a, 50b, they constitute the box-shaped sectional shape. A shaped member having a different sectional shape from those of the side posts 9, 10 may be used as the side post described above.

Three kinds of surface material 51, 52 having sheet thickness of 0.6 mm, 0.8 mm and 1.0 mm are prepared as the surface material 51, 52 described above. If the surface material 52 for the side plate members 50a, 50b constitutes the block X on the outdoor side of the car body, the surface material 52 having a sheet thickness of 1.0 mm is used. If the surface material 51 for the side plate members 50a, 50b constitutes the block X on the indoor side of the car body, the surface material 51 having a sheet thickness of 0.8 mm is used. If the surface material 52 for the side plate members 50a, 50b constitutes the block Y on the outdoor side of the car body, the surface material 52 having a sheet thickness of 0.8 mm is used. If the surface material 51 for the side plate members 50a, 50b constitute the block Y on the indoor side of the car body, the surface material 51 having a sheet thickness of 0.6 mm is used. Accordingly, the honeycomb panel which constitutes the side construction 2 and includes the side plate members 50a, 50b has the surface material 52, disposed on the outdoor side of the car body, which has a larger sheet thickness than that of the surface material 51 disposed on the indoor side of the car body. In the blocks X and Y described above, the surface material constructing the block X has a larger sheet thickness than that of the surface material constituting the block Y. The core material 53 constituting the side plate members 50a, 50b comprises a 0.2 mm thick sheet.

Several kinds of side plate members 50a, 50b are produced with their widths ranging from 0.5 m to 1 m. The side unit 2 is produced by disposing the side plate members having progressively greater widths as the side plate members are gradually away from the truck disposition position. Accordingly, the side plate members constituting the block X have smaller widths while the side plate members constituting the block Y have greater widths. The spacing between the side posts 9 and 10 becomes progressively greater as they are spaced apart progressively from the truck disposition position in conformity with the widths of the side plate members 50a and 50b. However, the spacing between the side posts 9, 10 is often changed in accordance with the specification of a passenger room. Accordingly, there often occurs the case where the side posts cannot be disposed in agreement with the joint portions of the side plate members. In such a case, the side plate members are produced by disposing the shaped members having the box-shaped sectional shape between the surface materials in such a manner as to correspond to the positions of disposition of the side posts. The side posts are bonded by welding to the surface of the surface materials in such a manner as to correspond to the positions of disposition of the shaped members having the box-shaped sectional shape described above.

Binding materials having the same sectional shape as that of the binding material 56 described above are fitted to the upper end portion of each block X, Y in the transverse direction, that is, to the side end portions of a roof unit. Each frieze board 12, which is composed of a shaped member of an aluminum alloy and is extended across the full length of the body structure in the longitudinal direction of the car body, is welded to the binding materials at the upper end of each block X, Y in the transverse direction. The frieze board 12 comprises a flat sheet portion shaped in an arc, a T-shaped rib formed integrally with the flat sheet portion at its car body indoor side and an L-shaped flange bonded to the roof construction 4. The L-shaped flange of the frieze board 12 is joined by welding to a cantrail 11 constituting the roof construction 4 which will be later described. When the L-shaped flange of the frieze board 12 and the cantrail 11 are joined, they constitute a beam forming the box-shaped section extending in the longitudinal direction of the car body.

A shaped member of an aluminum alloy corresponding to a rocker rail is fitted to the lower end portion of each block X, Y in the transverse direction, that is, to its end portion on the underframe side. The rocker rail has the same length as that of each block X, Y in the longitudinal direction of the car body. When the side unit 2 is constituted by joining each block X, Y, the rocker rail of each block is bonded at its end portion by welding.

The roof unit 4 is constructed by joining a plurality of blocks in the longitudinal direction of the car body in the same way as the side unit 2. Each block constituting the roof unit 4 comprises a plurality of roof plate members 60a, 60b in the same way as the side unit 2. Each roof plate member 60a, 60b includes surface materials 61, 62, a core material 63 and binding materials 65, 66. The roof plate member 60a is disposed at the end portion of the block in the longitudinal direction of the car body. The roof plate member 60b is disposed at an intermediate portion of the block. The roof plate member 60a is constructed by disposing the binding material 65, 66 around the outer periphery of the core material 63, interposing them by the surface materials 61, 62 and brazing them together. The roof plate member 60b is constructed by disposing the binding materials 65 around the outer periphery of the core material 63, interposing them by the surface materials 61, 62 and brazing them together. The block described above is constructed by combining the roof plate members 60a with 60b and welding them together.

A first carline 19 is disposed at each joint portion of the blocks. A second carline 20 is disposed at each joint portion of the roof plates inside each block. The first carline 19 has the same sectional shape as that of the side post 9. The sectional shape of the second carline 20 is the same as that of the side post 10. The roof plate members 60a and 60b have a length and a width of about 1 mm and a thickness of 30 mm. The block is constructed by disposing one or two roof plate members 60b between two roof plate members 60a and 60a, juxtaposing two rows of this combination and joining them together. The surface material 62 disposed on the outdoor side of the car body has a thickness of 1 mm and the surface material 61 disposed on the indoor side of the car body has a thickness of 0.8 mm. The core material 63 is 0.2 mm thick. The honeycomb panel that constitutes the roof unit 4 and comprises the roof plate members 60a and 60b has fundamentally the same construction as that of the honeycomb panel constituting the side construction 2 described above.

The end construction 5 is constructed by combining honeycomb panels of an aluminum alloy and joining them by welding in the same way as the side unit 2 and the roof unit 4. Of the two surface materials constituting the honeycomb panel, the surface material on the outdoor side of the car body is thicker than the surface material on the indoor side.

When a large number of electric appliances or other devices are fitted to the end unit, the end unit may be constructed by shaped members of a light weight alloy.

The production process of the body structure 1 will be explained. To begin with, the underframe 3 is constructed by disposing a plurality of cross beams 7 between the two side sills 6, welding them together, placing the floor members 8 on the upper surface of the cross beams 7 and joining them together by welding.

The side unit 2 is produced on a jig having the shape in conformity with the shape of the external surface of the side unit 2. First of all, the side plate members 50a, 50b as the honeycomb panel are produced in the vacuum furnace as already described. These side plate members 50a, 50b are combined in accordance with the specification of the blocks X, Y and are joined by welding. Each block X, Y is constructed by disposing the side plate members 50a at both ends in the longitudinal direction of the car body, disposing the side plate members 50b between the side plate members 50a, and welding and joining their respective binding materials 55. Each binding material at the end portion of each block X, Y in the transverse direction is also joined by welding, and the rocker rail described above is also fitted by welding. Two blocks Y are disposed between two blocks X and are then placed on the jig. While each block is restrained, the flanges 56f of the adjacent binding materials 56 are joined by welding. The binding material at each end of each block in the transverse direction as well as each rocker rail are welded. Next, each frieze board 12 is placed at the upper end portion of each block X, Y in the transverse direction. The side posts 9, 10 are then placed on the binding materials 55, 56 of the blocks X, Y. Thereafter, while the side posts 9, 10, the frieze board 12 and the blocks X, Y are restrained, the side posts 9, 10 and the frieze board 12 are fitted to the blocks X, Y by welding. In this manner, the side unit 2 is completed.

The roof unit 4 is produced on a jig having a shape which is in conformity with the outer surface of the roof unit 4. The roof plate members 60a, 60b as the honeycomb panel are produced in the vacuum furnace in the same way as the side plate members. These roof plate members 60a, 60b are combined in accordance with the specification of each block and joined by welding. The cantrails 11 are fitted to both ends of each block in the transverse direction by welding. The length of each cantrail 11 is in conformity with the length of the block in the longitudinal direction of the car body. A plurality of blocks constructed in this manner are joined by welding while they are placed on the jig and restrained. Joint of the blocks is achieved by welding the flanges of the binding materials 66 of each block. The cantrails 11, too, of each block is joined by welding. The first and second carlines 19, 20 are placed on a plurality of blocks thus joined. While the first and second carlines 19, 20 and each block are restrained, the first and second carlines 19, 20 are fitted to the binding materials 65, 66 of each block and to the cantrails 11. In this way, the roof unit 4 is completed.

The end unit 5, tool is produced on a jig in the same way as the side unit 2 or the roof unit 4.

The underframe 3, the two side units 2, the roof unit 4 and the two end units 5 are each constructed in the manner described above and are then assembled. Two side units 2 and two end units 5 are disposed on the underframe 3 and after positioning is completed, they are joined by welding. The roof unit 4 is then placed on the two side units 2 and the two end units 5 and after positioning is completed, they are joined by welding.

In accordance with the construction described above, the surface materials 52, 56 of the honeycomb panels constituting the body structure 1 on the outdoor side are thicker than the surface materials, for example, 51 and 61, on the indoor side. Therefore, pressure resistance can be improved and reduction of the weight can be achieved. In other words, the drop of stiffness is prevented by the structure of the honeycomb panel itself, and reduction of the weight can be accomplished by setting the sheet thickness of the surface materials on the indoor side and on the outdoor side as described above. Since a predetermined sheet thickness is secured for the surface materials of the honeycomb panel constituting the body structure 1 on the outdoor side, surface corrugation of the body structure 1 can be reduced. Accordingly, the quantity of a putty applied onto the surface of the body structure 1 for smoothing the surface of the body structure 1 can be reduced and eventually, the weight of the railway car can be reduced.

Since a predetermined sheet thickness is secured for the surface materials of the honeycomb panel constituting the body structure 1 on the outdoor side, damage to one of the surfaces of the honeycomb panel due to impingement with others during transportation of the honeycomb panel, etc, can be prevented. Accordingly, even when the honeycomb panel is produced with the lowest possible weight, its handling is relatively easy, so that the working efficiency during the production of the body structure 1 can be improved.

The side unit 2 is constituted by the side plate members 50a, 50b consisting of the honeycomb panel. For this reason, sufficient stiffness can be secured against variations in pressure outside the car body. In other words, the honeycomb panel is produced by disposing the core material between the two surface materials and joining them together. Therefore, the honeycomb panel has high stiffness against in-plane and out-plane loads due to its own structure. Since the side unit 2 is composed by the side plate members 50a, 50b consisting of the honeycomb panels having such features, in-plane and out-plane stiffness of the side unit can be improved. This is effective for improving pressure resistance of the side unit 2 and for reducing its weight. Since the honeycomb panel constructed by the side plate members 50a, 50b is produced by brazing and joining the surface materials, the core materials and the binding materials, it exhibits a smaller change with time in comparison with bonding by a resin bonding material of the prior art technique and also has higher reliability.

Since the side plate members 50a, 50b can be made relatively thinner than the shaped member used conventionally, the side unit 2 can be made lighter in weight. The conventional honeycomb panel using a resin bonding material for a railway car uses the resin bonding material or rivets for joining the honeycomb panels with one another or joining the honeycomb material with the shaped members. Therefore, the overlap portion of the joint portion becomes thick. Accordingly, sufficient reduction of the weight cannot be expected of the honeycomb panel using the resin bonding material. Furthermore, it is difficult by this honeycomb panel to make the surface of the side unit flat. Since the side plate members 50a, 50b described above are joined by welding, there is no overlap portion at the joint portion, and hence reduction of the weight can be achieved. Since the side plate members 50a, 50b are joined by welding, the joining work can be completed within a short time. The surface of the joint portion by welding can be easily finished to a smooth surface by a grinder.

The side unit 2 comprises the block X whose surface materials 51, 52 are thick and the block Y whose surface materials 51, 52 are thin. Therefore, the block X of the side unit 2 which is close to the truck disposition position has higher stiffness than the block Y spaced apart from the truck disposition portion. The shearing stress and bending moment acting on the side unit are the highest at the portion near the truck disposition position and decrease progressively at portions progressive y spaced apart from the truck disposition position. Since the side unit 2 is constructed in such a manner so as to cope with these shearing stress and bending moment, the weight can be reduced while securing strength. The side posts 9, 10 constituting the side unit 2 are disposed with gradually smaller spacings between them toward the truck disposition position in the longitudinal direction of the car body. Since the side posts 9, 10 are disposed in this manner, the weight can be reduced while securing the strength of the side unit 2.

Shaped members having a box-shaped sectional shape can be disposed in advance inside the honeycomb panel in conformity with the positions of disposition of the side posts 9, 10 described above. If the side posts 9, 10 are disposed at the disposition positions the shaped members, the positions of disposition of the side posts 9, 10 can be determined arbitrarily. If the honeycomb panel is constructed in this way, the side posts 9, 10 can be disposed at arbitrary positions and stiffness of the side unit 2 can be easily varied in accordance with the specification required for the railway car body.

The blocks X and Y are joined by welding the flanges 56f of the butted binding materials 56. Therefore, each block X, Y can be joined by the welding operation from only one side on the indoor side. The flanges 56f described above are constructed so that their surfaces define the surface of the side unit. Therefore, the surface of the side unit can be easily smoothed by merely finishing the surface of the joint portions of the blocks X, Y by a grinder.

If the binding material 56 are disposed throughout the entire periphery of each side plate member, the joint of all the side plate members can be made by the welding operation from only one side as described above. This means that a plurality of outer side plate members need not be turned inside out when they are joined, and the joining operation can therefore be simplified.

To produce the side plate members 50a, 50b with the smallest weight, the following construction may be employed. Each side plate member is divided into upper and lower two parts, that is, the upper part forming the side window opening 17 and the lower part covering the other portions. The thickness of the surface materials of the lower part, that is, the surface materials of both outdoor and indoor sides, for example, are set to 0.6 mm. In this way, the side plate members 50a, 50b can be produced with the smallest weight.

Figure 6:
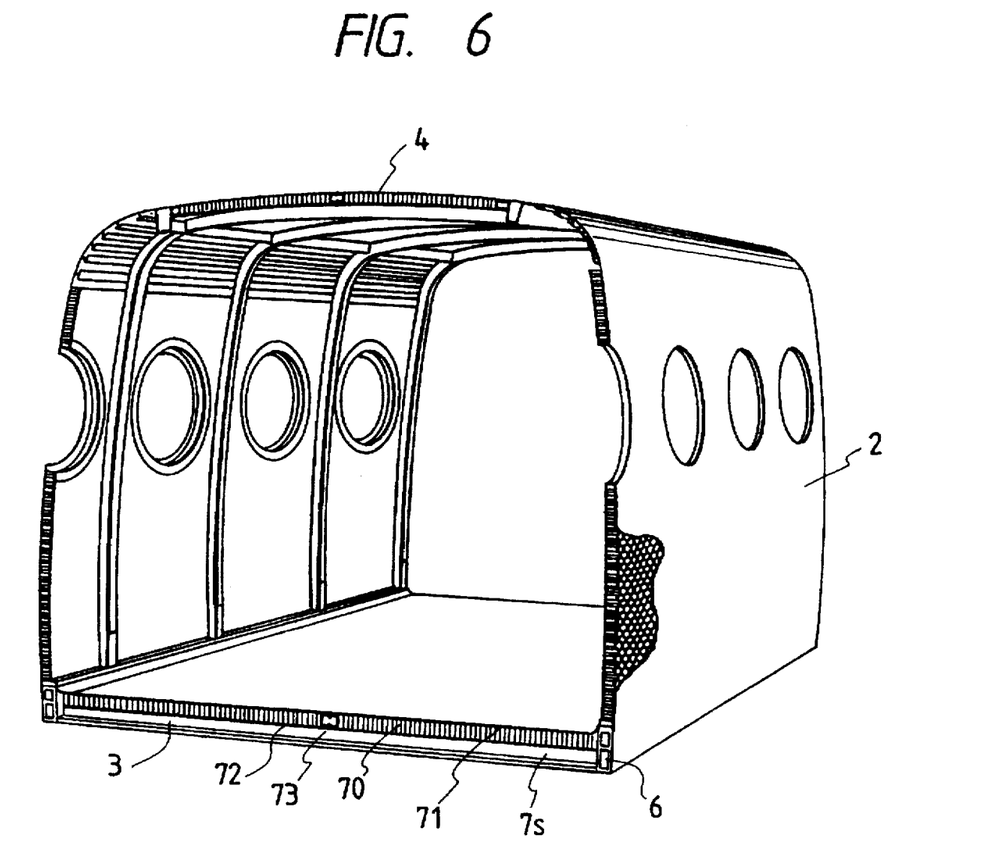
FIG. 6 is a perspective view showing a railway car body structure in accordance with a second embodiment of the present invention.

A second embodiment of the present invention will be explained with reference to FIG. 6, wherein like reference numerals are used to identify like elements as in the first embodiment. The characterizing feature of the second embodiment resides in that the floor plates disposed on the underframe in the first embodiment are composed of honeycomb panels. Therefore, the construction of the second embodiment other than the floor plates is the same as that of the first embodiment. Reference numeral 70 represents the floor plates that are disposed on the upper surface of the cross beams 7s constructing the underframe 3. The floor plate 70 comprises the surface materials 71, 72, the core material 73 sandwiched between the surface materials and two kinds of binding materials. The surface material 72 is disposed on the outdoor side of the car body and is thicker than the surface material 71. Incidentally, the surface material 71 is 0.8 mm thick and the surface material 72 is 1 mm thick. The height of the cross beams 7s is smaller than that of the cross beams in the first embodiment. The definite structure of the floor plate 70 is substantially the same as that of the side plate. Therefore, when the two kinds of binding materials described above are combined, two kinds of honeycomb panels can be formed. The block for constructing the floor plate is produced by combining the two kinds of honeycomb panels A plurality of blocks described above are joined to constitute the floor plate 70.

According to the construction described above the floor plate 70 can be composed of the honeycomb panels whose surface material 72 on the outdoor side is made thick and consequently, the pressure resistance of the underframe 3 can be improved. The underframe 3 can be made light in weight, as well. Since the surface material 72 on the outdoor side is thick, the joining operation of the floor plate 70 with the cross beams 7s can be simplified. Since the floor plate 70 has higher out-plane stiffness than the floor plate of the first embodiment, the height of the cross beams 7s can be reduced. Accordingly, the overall height of the underframe 3 can be reduced and hence, larger space inside the passenger room or a larger space beneath the floor plate in which various appliances are fitted can be attained.

Figure 7:
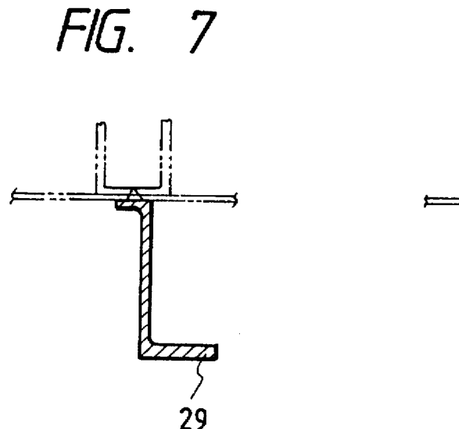
FIGS. 7 and 8 are sectional views showing the sectional shapes of a side post and a carline, respectively.

In the embodiments described above, the side posts 9, 10 are composed of the shaped members having the U-shaped and II-shaped sectional shapes, but a shaped member 29 having a Z-shaped sectional shape such as shown in FIG. 7 can be used for the side posts. If two of these members 29 are arranged to face each other and are joined, a similar shape to that of the aforementioned side sill 9 having the U-shaped sectional shape can be obtained. The shaped member 29 having the Z-shape may be used singly as the side post. If various side posts are constituted by the shaped members having the Z-shaped sectional shape, the members can be used in common and the production cost can be reduced.

Figure 8:
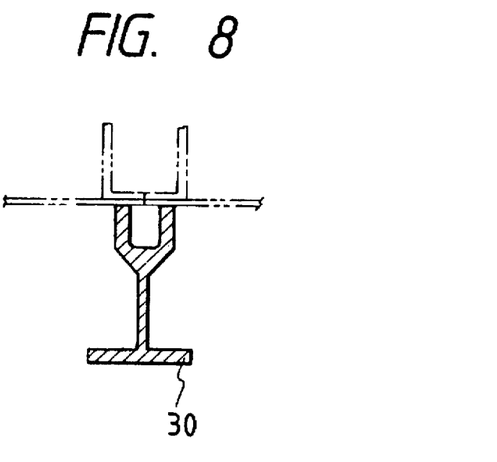

Furthermore, a shaped member 30 having a Y-shape such as shown in FIG. 8 can be used for the side post. Since the sectional shape of this shaped member 30 is axially symmetric, it has higher stiffness than the Z-shaped member 29 described above. Since a groove is defined at the tip portion of the joint portion, joint can be effected while bridging ever a weld bead of the joint portion of the plate members.

A body structure for a rolling stock in another embodiment according to the present invention will be described hereinafter with reference to FIGS. 9 to 12.

Figure 9:
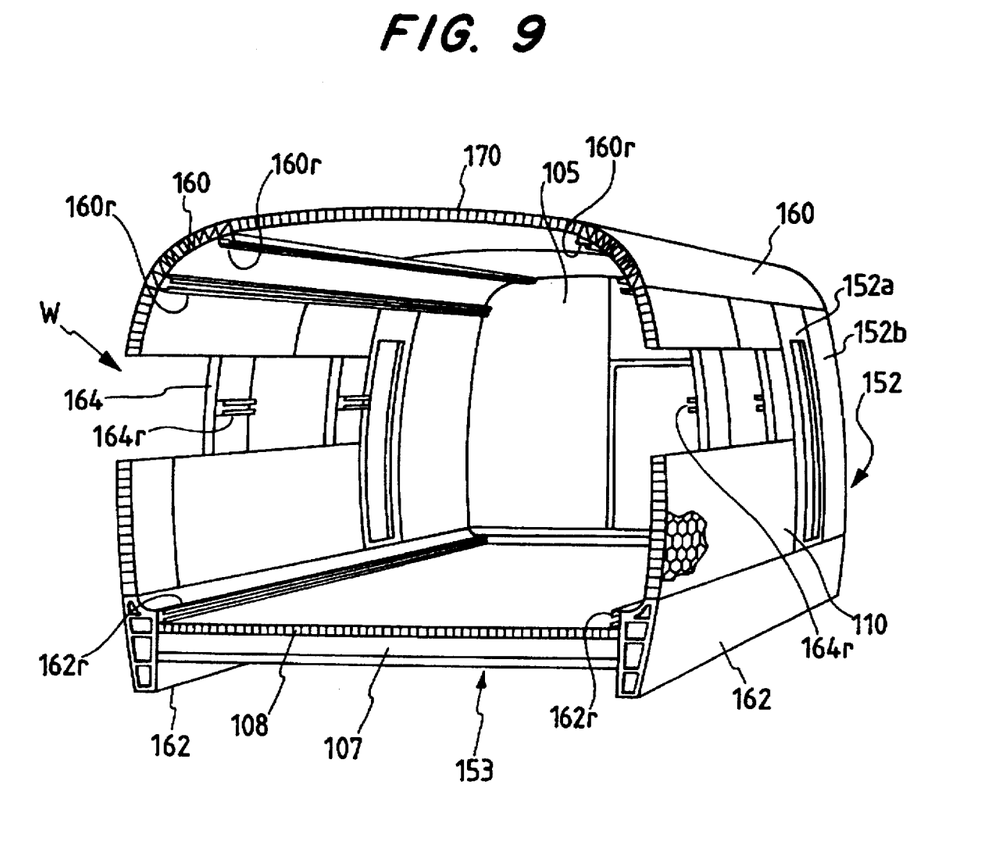
FIGS. 9 to 12 show another embodiment of the present invention.

Referring to FIG. 9, a side structure 152 comprises laminated panels 110 forming a wainscot, laminated panels 110 forming a window header, pier panels 164 disposed between windows W and interconnecting the laminated panels 110, and an extruded shape 160 having a closed cross section and disposed on the laminated panel 110 forming the window header. Each of the laminated panels 110 forming the wainscot and the window header has a substantially trapezoidal shape having a longer upper side and a shorter lower side to form the side structure 152 in an upward convex shape, i.e., a cambered shape. The laminated panels 160 are arranged longitudinally of the body and the adjacent laminated panels 160 are joined together to form a cambered side structure 152. The periphery of each doorway is defined by a doorway panel 152a formed by putting extruded shapes together in the shape of a gate and joined to the laminated panels 110.

The doorway panel 152a is joined to the laminated panels 110 and the extruded shapes 160, and has a generally rectangular shape. A side wall 152b of a utility room, contiguous with the doorway panel 152a, may be formed by assembling extruded shapes to facilitate the arrangement of interior trims.

Figure 11:
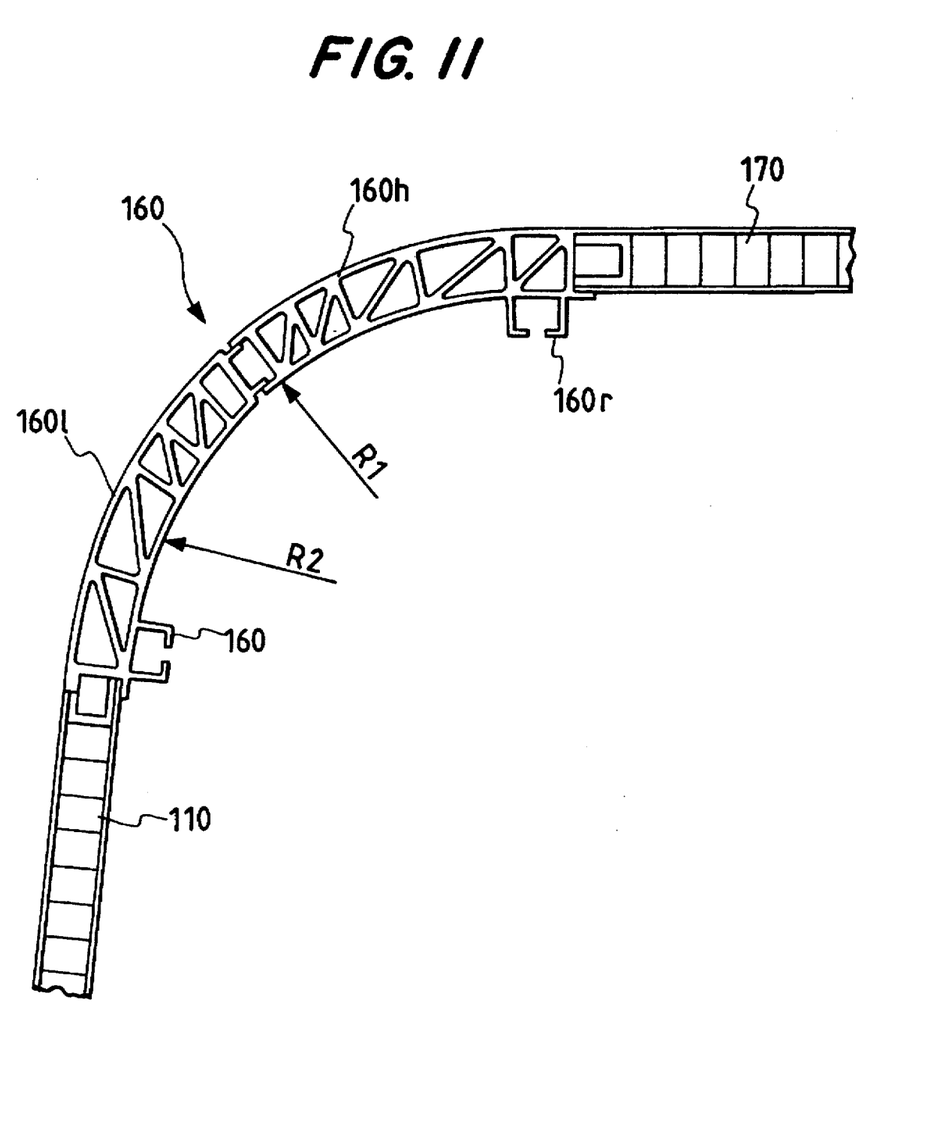

The extruded shapes 160 will be described with reference to FIG. 11. The extruded shape 160 forming an upper part of the side structure, having a small curvature, has a comparatively large width in the range of about 800 to about 1000 mm, and, hence, in view of the state-of-the-art, the extruded shape 160 must be formed in divisions. Therefore, the extruded shape 160 is formed by joining and welding together extruded shapes 160h and 160l. The radius R2 of curvature of portions of the extruded shape 160 near the opposite longitudinal sides is greater than the radius R1 of curvature of the central portion of the same to secure a large space for the compartment. It is preferable to weld the extruded shapes 160h and 160l together before joining the extruded shape 160 to the laminated panels 110 because the extruded shapes 160h and 160l can satisfactorily and accurately be welded together when the same are welded together before the extruded shape 160 is joined to the laminated panels 110. The extruded shape 160 thus formed is advantageous as a member for bearing a high stress.

Fitting holding rails 160r for holding interior trims are formed integrally with the extruded shapes 160h and 160l on their inner surface along one longitudinal side of each of the extruded shapes 160h and 160l. The fitting holding rails 160r are used for holding parcel racks, interior face boards, and ducts for air-conditioning and ceiling panels, which will be described later.

The extruded shapes 160h and 160l are formed in a closed cross section, i.e., a cross section having hollow spaces, to secure rigidity and to form the extruded shapes 160h and 160l in lightweight structures. The hollow spaces are formed in a higher density in portions of the extruded shapes 160h and 160l having smaller radii of curvature so that the extruded shape 160 has a sufficiently high strength and withstands positive and negative bending loads.

As shown in FIG. 9, the pier panels 164, similarly to the extruded shapes 160, are formed in a closed cross section by extrusion, and a fitting holding rail 160r is formed integrally with each of the pier panels 164 on the inner surface of the pier panel 164.

An underframe 153, substantially similar to that of the foregoing embodiment, is formed by extending cross beams 107 across a pair of side beams 162, and extending floor panels 108 on the cross beams 107 and the sidebeams 162. A holding rail 162r is formed integrally with each side beam 162 at a position above the junctions of the side beam 162 and the cross beams 107. The lower side of a side interior face board covering the inner surfaces of the window header panels, areas around the windows and the wainscot panels is fastened to the holding rail 162r with bolts and the like. The upper side of the side interior face board is hooked to the interior fixture holding rail 160r of the extruded shape 160l, the middle part of the side interior face board is pressed against the interior fixture holding rail 164 of the pier panels 164, and the lower side of the side interior face board is fastened to the holding rail 162r. The side interior panel is curved in a radius of curvature smaller than that of the inner surface of the side structure 152, the upper and the lower side of the side interior panel are fixed and the middle part of the same is pressed against the pier panels 164. The space between the side structure 52 and the side interior board is filled up with a resilient thermal insulating material for heat-insulation and for the prevention of vibration of the inside interior board. The thermal insulating material is urethane foam or the like.

Basically, a roof structure 154 (see FIG. 10) is constructed by arranging a plurality of laminated panels 170 longitudinally of the body structure and joining together the adjacent laminated panels 170. The edges of the opposite longitudinal ends of each laminated panel 170 are shaped so that the lower side is shorter than the upper side to form the roof structure in a cambered shape. Therefore, when the laminated panels 170 are joined together by welding, the roof structure is cambered with respect to the longitudinal direction of the body structure.

Figure 10:
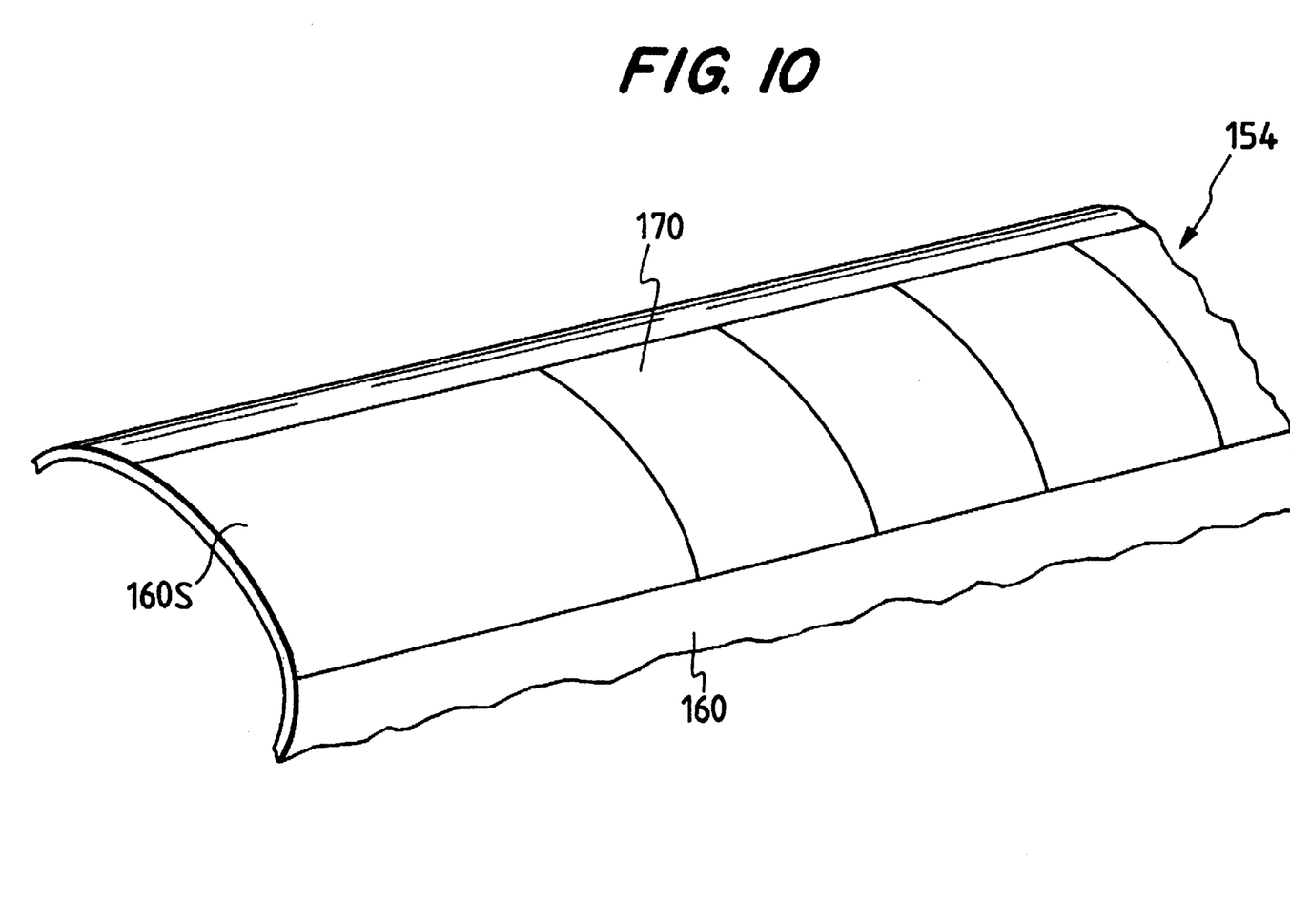

Some of the various body structures are designed to support current collecting equipment or insulations for supporting extra-high tension cables on the roof. A portion of the roof structure for supporting such heavy equipment is formed by an extruded shape 160S having a closed cross section as shown in FIG. 10. The extruded shape 160S is constructed by arranging a plurality of shapes along the width of the body structure and joining together the adjacent shapes. Support members for supporting current collecting equipment, such as support rails, are formed integrally with the extruded shape 160S. FIG. 10 shows a part of the body structure around the junction of the roof structure 154 and the extruded shape 160 of the side structure 152, and the lower part of the side structure 152 is omitted. Since the laminated panels 110, namely, the basic structural members, are formed to form the side structure 152 in a cambered structure, the cambered extruded shapes 160 are joined to the laminated panels 160. Since the roof structure 154 is also cambered, the side structure 152 and the roof structure 154 can accurately and comparatively easily be joined together by easy work. Since at least either the side structure 152 or the roof structure 154 is an extruded shape, a continuous, longitudinal beam extends along the junction of the side structure 152 and the roof structure 154 to reinforce the body structure against any vertical bending load; that is, the laminated panels 170 of the roof structure are joined along weld lines extending along the width of the body structure, and, hence, it is advantageous to provide the longitudinal beam extending perpendicularly to the weld lines for securing reliability in strength.

The cambers of the side structure 152 and the roof structure 154 can comparatively easily be formed as compared with forming a camber by processing the laminated panels 110 or the laminated panels 170 to bend the plurality of extruded shapes. It is advantageous to extend the extruded shape 160 longitudinal of the body structure with respect to the reliability in strength of the weld zones. The combination of the side structure 152 and the roof structure 154 provides a structure having both these advantages.

The extruded shapes 160 may be included in the roof structure. In such a case, first the extruded shape 160 and the extruded shape 160S are put together, and then a plurality of laminated panels 170 joined together in a unit are joined to the extruded shape 160 and the extruded shape 160S.

Figure 12:
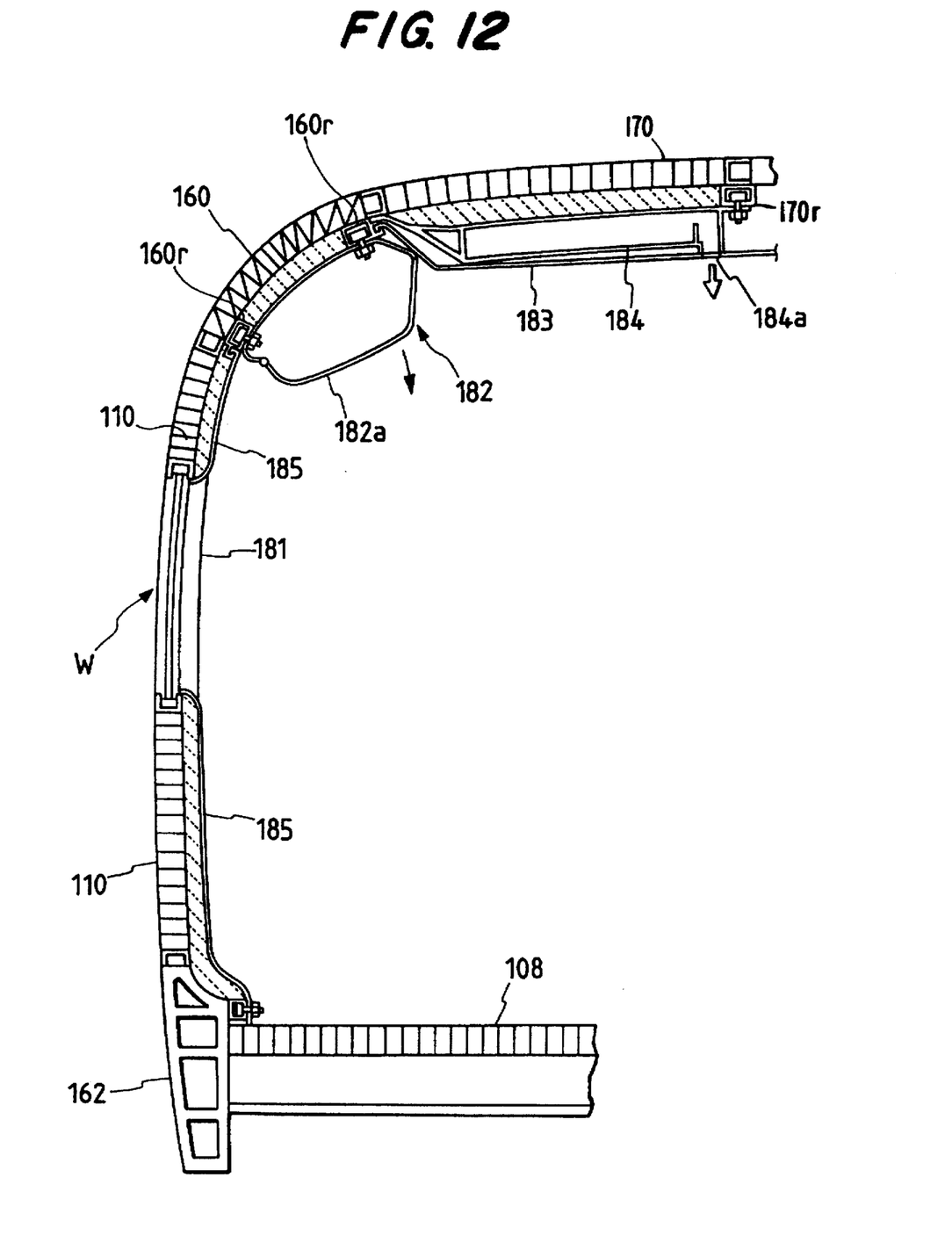

Arrangement of interior fittings on the structure will be described with reference to FIG. 12. A side interior face board 181 covers an area from the wainscot of the side structure 152 through the upper part of the side beam 162. The side interior face board 181 covers the inner surfaces of the window headers, areas surrounding the windows W and the wainscot. The side interior board 181 is fabricated by forming an aluminum alloy plate by pressing and coating the formed aluminum alloy plate with a resin sheet. The side interior face board 181 is curved in a radius of curvature smaller than that of the side structure 152. The upper side of the side interior face board 181 is fastened to the interior fitting holding rail 160r of the extruded shape 160, the lower side of the same is fastened to the fixture holding rail 162r of the side beam 162, and the space between the side structure 152 and the side interior face board 181 is filled up with a thermal insulating material. The middle portion, with respect to the width, of the side interior face board 182 is pressed against the interior fixture holding rails 164r of the pier panels 164 because the curvatures of the side structure 152 and the side interior face board 181 are different from each other. The side interior side board 181 is fastened to the fixture holding rails 164r of the pier panels 165 with screws screwed in the fixture holding rails 164r from the side of the compartment or by hooking fixtures attached beforehand to the side interior face board 181 to the fixture holding rails 164r. If necessary, reinforcing members are attached adhesively to the back side of the side interior face board 181 so as to extend along the direction of height of the body structure.

The lower end and the upper end of a parcel rack 182 are fastened to the fixture holding rails 160r of the extruded shape 160 with fastening bolts. The lower end of the parcel rack 182 fastened to the fixture holding rail 160r covers the upper side of the side interior face board 181. The parcel rack 182 is provided with a hinged front lid 182a and the fastening bolts fastening the parcel rack 182 to the fixture holding rails 160r are arranged within the parcel rack 182. Therefore, the fastening bolts are not exposed to the compartment.

A ceiling board 183 is extended between and fastened to the fixture holding rails 160r of the opposite extruded shapes 160. An air duct 184 for air conditioning is extended in the space between the ceiling board 183 and the roof structure. The air duct 184 has one side fastened to the fixture holding rail 160r and the other side fastened to a fixture holding rail 170r attached to the internal reinforcing members of the laminated panels 170. The fixture holding rail 170r is attached to internal reinforcing members in the laminated panel 170, by fixing members inserted in holes formed in the internal reinforcing members. Conditioned air is supplied from one end of the air duct 184 on the side of the end panel of the body structure and is blown out into the compartment through air outlets 184a provided on the ceiling board 184.

When outfitting the interior of the rolling stock, the ceiling and the side walls are outfitted first with fixtures, and then the parcel racks 182 are put on the side walls. The ceiling boards 183 are attached to the body structure after installing the air duct 184.

The side interior face boards 181 are attached to the inner surfaces of the side structure 152 after spreading the thermal insulating material 185 over the inner surface of the side structure 152. Then, the parcel racks 182 are fastened to the extruded shapes 160 so as to cover the junctions of the ceiling boards 183 and the side interior face boards 181 so that the interior of the rolling stock looks attractive. When the parcel rack 182 has one end to be hooked to the fixture holding rail 160r and the other end to be fastened to the other fixture holding rail 160r with fastening bolts, the parcel rack 182 can be installed easily.

The body structure thus constructed is provided with the longitudinal extruded shapes 160, i.e., shapes having a closed cross section, extended along the upper opposite corners, and the longitudinal side beams 162, i.e., shapes having a closed cross section, extended along the lower opposite corners, and the longitudinal extruded shapes 160 and the longitudinal side beams 162 are joined to the laminated panels 110 and 170. Accordingly, the body structure has a comparatively high bending rigidity (EI).

Since the laminated panels 110 and 170 are shaped so as to form cambers, the cambered body structure can easily be constructed by welding together the adjacent laminated panels 110 and 170. Combined use of the laminated panels 110 and 170, and the extruded shapes 160 improves the reliability in strength of the weld zones.

Since the outer surfaces of the laminated panels 110 and 170, and the extruded shapes 160 at their junctions are flush with each other, the surfaces of the body structure can easily be finished to have smooth surfaces, and variable positive and negative pressures acting on the body structure can uniformly be distributed so that stress concentration and the like can be prevented. Since the sides of the extruded shapes 160 are formed so that the longitudinal sides of the roof structure 154 can be put on the side structures 152, the side structures 152 and the roof structure 154 can easily be joined together as compared with a side structure and a roof structure which are put opposite to each other when joining the same together.

The ribs defining hollow spaces in the curved portion having a comparatively small radius of curvature of the extruded shape 160 are arranged at small intervals to enhance the rigidity of the curved portion, and, hence, the size of the extruded shape 160 may be comparatively small. Consequently, a compartment having a comparatively large space can be formed by using the extruded shapes 160 having a sufficiently high strength.

The thickness of the middle portion of the extruded shape 160 in which stress concentration is liable to occur may be increased to enhance the rigidity of the extruded shape 160.

Each pier panel 164 has an extruded shape having a closed cross section and a length corresponding to the width of the window. A longitudinally continuous, hollow extruded panel may be used instead of the pier panels 164, and openings corresponding to the windows may be formed in the longitudinally continuous, hollow extruded panel by machining; that is, a longitudinally continuous, hollow extruded panel provided integrally with window frames may be used instead of the pier panels 164, and the laminated panels may be joined to the longitudinally continuous, hollow extruded panel to construct the body structure. A body structure thus constructed has an enhanced strength and lightweight construction because the window frames are formed integrally with the body structure.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description, and all changes which come within the meaning and range of equivalency of the claims are therefor intended to be embraced therein.

We claim:

1. A railway car body structure comprising an underframe, first and second side structural units, and a roof structural unit, wherein each of said first and second side structural units and said roof structural unit include a plurality of plate members, each of said plate members being formed by joining two surface members, a core material and binding materials through metal-to-metal brazing, each of said plate members joined together in end-to-end relationship by welding to respectively form said first and second side structural units and said roof structural unit, wherein said first side structural unit is joined to the roof structural unit by a first extruded element, and wherein said second side structural unit is joined to said roof structural unit by a second extruded element, wherein each of the first and second extruded elements are located in a longitudinal direction of the car body structure, and wherein said first extruded element connects each of said plate members forming said first side structural unit to each of said plate members forming said roof structural unit, wherein said second extruded element connects each of said plate members forming said second side structural element to each of said plate members forming said roof structural unit, wherein each of said first and second extruded elements are hollow, and each of said hollow first and second extruded elements includes an inner surface and an outer surface, wherein the inner surface of the first extruded element joins an inner surface of the first side structural unit with an inner surface of the roof structural unit to form a joint portion with a smooth inner surface, and wherein the inner surface of the second extruded element joins an inner surface of the second side structural unit with the inner surface of the roof structural unit to form a joint portion with a smooth inner surface, and wherein the outer surface of the first extruded element joins an outer surface of the first side structural unit with an outer surface of the roof structural unit to form a joint portion With a smooth outer surface, and wherein the outer surface of the second extruded element joins an outer surface of the second side structural unit with the outer surface of the roof structural unit to form a joint portion with a smooth outer surface.

2. A railway car body structure comprising an underframe, first and second side structural units, a roof structural unit, and first and second end structural units, wherein each of said first and second side structural units and said roof structural unit include a plurality of plate members, each of said plate members being formed by joining two surface members, a core material and binding materials through metal-to-metal brazing, each of said plate members joined together in end-to-end relationship by welding to respectively form said first and second side structural units and said roof structural unit, wherein said first side structural unit is joined to the roof structural unit by a first extruded element, and wherein said second side structural unit is joined to said roof structural unit by a second extruded element, wherein each of the first and second extruded elements are located in a longitudinal direction of the car body structure, and wherein said first extruded element connects each of said plate members forming said first side structural unit to each of said plate members forming said roof structural unit, wherein said second extruded element connects each of said plate members forming said second side structural unit to each of said plate members forming said roof structural unit, wherein each of the first and second extruded elements are hollow in a longitudinal direction of the car body structure, and each of said hollow first and second extruded elements includes an inner surface and an outer surface, wherein the inner surface of the first extruded element joins an inner surface of the first side structural unit with an inner surface of the roof structural unit to form a joint portion with a smooth inner surface, and wherein the inner surface of the second extruded element joins an inner surface of the second side structural unit with the inner surface of the roof structural unit to form a joint portion with a smooth inner surface, and wherein the outer surface of the first extruded element joins an outer surface of the first side structural unit with an outer surface of the roof structural unit to form a joint portion with a smooth outer surface, and wherein the outer surface of the second extruded element joins an outer surface of the second side structural unit with the outer surface of the roof structural unit to form a joint portion with a smooth outer surface.

3. A railway car body structure comprising an underframe, first and second side structural units, and a roof structural unit, wherein each of said first and second side structural units and said roof structural unit include a plurality of plate members, each of said plate members being formed by joining two surface members, a core material and binding materials through metal-to-metal brazing, each of said plate members joined together in end-to-end relationship by welding to respectively form said first and second side structural units and said roof structural unit, wherein said first side structural unit is joined to the roof structural unit by a first extruded element, and wherein said second side structural unit is joined to said roof structural unit by a second extruded element, wherein each of the first and second extruded elements are located in a longitudinal direction of the car body structure, and wherein said first extruded element connects each of said plate members forming said first side structural unit to each of said plate members forming said roof structural unit, wherein said second extruded element connects each of said plate members forming said second side structural unit to each of said plate members forming said roof structural unit, wherein each of the first and second extruded elements are comprised of a plurality of extruded portions joined together by welding, and wherein each of said extruded portions extends in a direction of the longitudinal axis of the railway car body structure perpendicular to welds joining the plate members of first and second side structural units and the roof structural unit.

4. A railway car body structure according to claim 3, wherein said first extruded element is connected to the plate members forming the first side structural units and the roof structural unit by welding, and wherein said second extruded element is connected to the plate member forming the second side structural units and the roof structural unit by welding.

5. A railway car body structure comprising an underframe, first and second side structural units, a roof structural unit, and first and second end structural units, wherein each of said first and second side structural units and said roof structural unit include a plurality of plate members, each of said plate members being formed by joining two surface members, a core material and binding materials through metal-to-metal brazing, each of said plate members joined together in end-to-end relationship by welding to respectively form said first and second side structural units and said roof structural unit, wherein said first side structural unit is joined to the roof structural unit by a first extruded element, and wherein said second side structural unit is joined to said roof structural unit by a second extruded element, wherein each of the first and second extruded elements are located in a longitudinal direction of the car body structure, and wherein said first extruded element connects each of said plate members forming said first side structural units to each of said plate members forming said roof structural unit, wherein said second extruded element connects each of said plate members forming said second side structural unit to each of said plate members forming said roof structural unit, wherein each of the first and second extruded elements are comprised of a plurality of extruded portions joined together by welding, wherein each of said extruded portions extends in a direction of the longitudinal axis of the railway car body structure perpendicular to welds joining the plate members of first and second side structural units and the roof structural unit.

6. A railway car body structure comprising an underframe, first and second side structural units, and a roof structural unit, wherein each of said first and second side structural units and said roof structural unit include a plurality of plate members, each of said plate members being formed by joining two surface members, a core material and binding materials through metal-to-metal brazing, each of said plate members joined together in end-to-end relationship by welding to respectively form said first and second side structural units and said roof structural unit, wherein said first side structural unit is joined to the roof structural unit by a first extruded element, and wherein said second side structural unit is joined to said roof structural unit by a second extruded element, wherein each of the first and second extruded elements are located in a longitudinal direction of the car body structure, and wherein said first extruded element connects each of said plate members forming said first side structural unit to each of said plate members forming said roof structural unit, wherein said second extruded element connects each of said plate members forming said second side structural unit to each of said plate members forming said roof structural unit, wherein said first extruded element extends in a direction parallel to a longitudinal axis of the railway car body structure, perpendicular to welds joining the plate members forming the first side structural unit and the roof structural unit and wherein said second extruded element extends in the same direction as the first extruded element perpendicular to welds joining the plate members of the second side structural unit and the roof structural unit.

7. A railway car body structure comprising an underframe, first and second side structural units, a roof structural unit, and first and second end structural units, wherein each of said first and second side structural units and said roof structural unit include a plurality of plate members, a core material and binding materials through metal-to-metal brazing, each of said plate members joined together in end-to-end relationship by welding to respectively form said first and second side structural units and said roof structural unit, wherein said first side structural unit is joined to the roof structural unit by a first extruded element, and wherein said second side structural unit is joined to said roof structural unit by a second extruded element, wherein each of the first and second extruded elements are located in a longitudinal direction of the car body structure, and wherein said first extruded element connects each of said plate members forming said first side structural unit to each of said plate members forming said roof structural unit, wherein said second extruded element connects each of said plate members forming said second side structural unit to each of said plate members forming said roof structural unit, wherein said first extruded element extends in a direction parallel to a longitudinal axis of the railway car body structure, perpendicular to welds joining the plate members forming the first side structural unit and the roof structural unit, and wherein the second extruded element extends in the same direction as the first extruded element, perpendicular to welds joining the plate members of the second side structural unit and the roof structural unit.

* * * * *